United States Patent [19]

Hintz et al.

[11] Patent Number: 5,579,515

[45] Date of Patent: Nov. 26, 1996

[54] METHOD OF CHECKING INDEX INTEGRITY IN A DB2 DATABASE

[75] Inventors: Thomas E. Hintz; Kerry C. Tenberg, both of Austin, Tex.

[73] Assignee: BMC Software, Inc., Houston, Tex.

[21] Appl. No.: 168,962

[22] Filed: Dec. 16, 1993

[51] Int. Cl.⁶ .................................. G06F 7/00; G06F 9/00
[52] U.S. Cl. ........................... 395/607; 364/DIG. 1; 364/282.1; 364/283.1; 364/222.9; 364/283.4; 364/255.2; 364/255.7
[58] Field of Search ................... 395/600; 364/DIG. 1

[56]  References Cited

U.S. PATENT DOCUMENTS

| | | | |
|---|---|---|---|
| 4,817,036 | 3/1989 | Millett et al. | 395/600 |
| 4,933,848 | 6/1990 | Haderle et al. | 395/600 |
| 5,089,985 | 2/1992 | Chang et al. | 395/600 |
| 5,121,493 | 6/1992 | Ferguson | 395/600 |
| 5,133,068 | 7/1992 | Crus et al. | 395/600 |
| 5,146,590 | 7/1992 | Lorie et al. | 395/600 |
| 5,222,235 | 6/1993 | Hintz | 395/600 |
| 5,307,484 | 4/1994 | Baker et al. | 395/600 |
| 5,404,510 | 4/1995 | Smith et al. | 395/600 |
| 5,497,486 | 3/1996 | Stolfo et al. | 395/600 |

OTHER PUBLICATIONS

The art of Computer Programming. Donald E. Knuth vol. 3 pp. 159–168 Addison–Wesley Publishing Co. 1973.

*Primary Examiner*—Thomas G. Black
*Assistant Examiner*—Jean R. Homere
*Attorney, Agent, or Firm*—Arnold, White & Durkee

[57]  ABSTRACT

A single-phase CHECK INDEX operation for DB2 entails creating a special SORT record for each data record and each index entry, collating the special SORT records in a particular way to group together the SORT records for each data record and any associated index entries, and performing diagnostic operations on the sorted records.

6 Claims, 7 Drawing Sheets

Sort Record Layout

| Row ID | IX ID | TB ID | KEY VALUE |

Sort Key

| | | |
|---|---|---|
| Row ID | 4 bytes | Physical Location of Row |
| Index Identifier | 2 bytes | Identifies source for this record. (0 if record is from data) |
| Table Identifier | 2 bytes | Identifies source table. |
| Key Value | variable | |

FIG. 6

PseudoCode     (Parentheticals refer to blocks in Figure 7)

Get a sort record (701)
    If record contains data columns: (702)
        Check that previous record had all index entries. (713)
            If not, issue message indicating missing entries. (714)
        Copy current data record to memory. (715)
        Reset next expected index to start of index identifier list. (716)
        Get next sort record. (701)

If record contains index entry: (702)
        Check that RID matches RID of current data record. (703)
            If not equal, issue message indicating index entry has no row. (704)
                Get next sort record. (701)
        Check that the index identifier equals the next expected index. (705)
            If higher, issue message indicating missing index entry(s). (706)
                Get next sort record. (701)
            If lower, issue message indicating duplicate index entry. (707)
                Get next sort record. (701)
            If equal, increment next expected index identifier. (708)
        Check that the key value matches the key value from the current data record. (710)
            If not equal, issue message indicating key mismatch. (711)
        Get next sort record. (701)

FIG. 7

METHOD OF CHECKING INDEX INTEGRITY IN A DB2 DATABASE

BACKGROUND OF THE INVENTION

In the prior art, a well-known process that is executed periodically for DB2 installations is to check the indexes of a database. Generally speaking, this entails ensuring that the physical data records (sometimes referred to as rows) are properly indexed. That is, for each data row should have exactly one index entry (e.g., "Last Name" for a personnel data record), and that the key value, in the physical data record or row matches the key value as stored in the appropriate index entry for that data row.

Some nomenclature is introduced here to aid in understanding the terminology used. A principal term used here is that of a "data set." Generally speaking, a data set is a collection of data that is referred to in an operating system environment (e.g., the well-known MVS operating system environment) by a single name, in much the same way as a word processing file might be given a single directory name for easy retrieval of the data in the file (even though the data might physically be stored in a variety of locations on a disk). Examples of MVS data sets include DB2 indexes and DB2 table spaces. Typically, maintenance operations in the DB2 environment involve three steps: First, reading the data to be reorganized (e.g., from a table space or index), often from a variety of different physical locations identified by a data set name. The step of data reading is typically referred to as an UNLOAD process that involves physically copying the data to some other memory or other storage. The second step is that of sorting or otherwise ordering the data to conform to the desired ordering and performing any other desired processing. Finally, the third step is that of rewriting the sorted data to storage (table space or index) designated with the same data set name. The third step is typically referred to as a RELOAD process.

Figure 1:
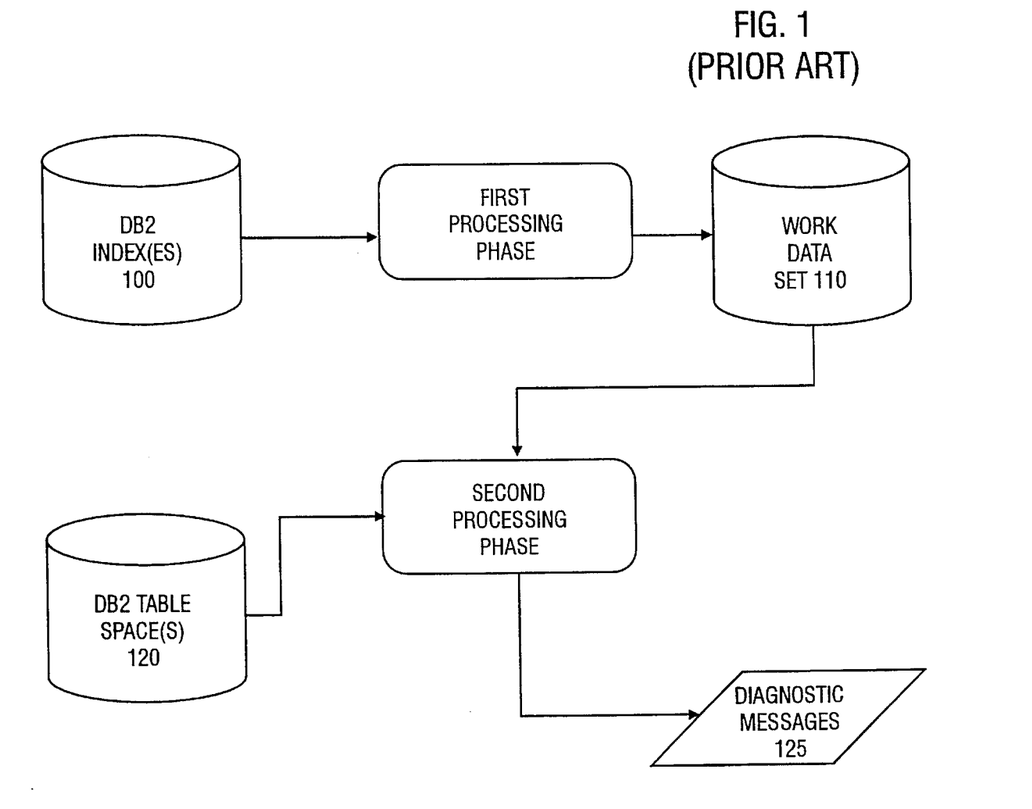
Figure 2:
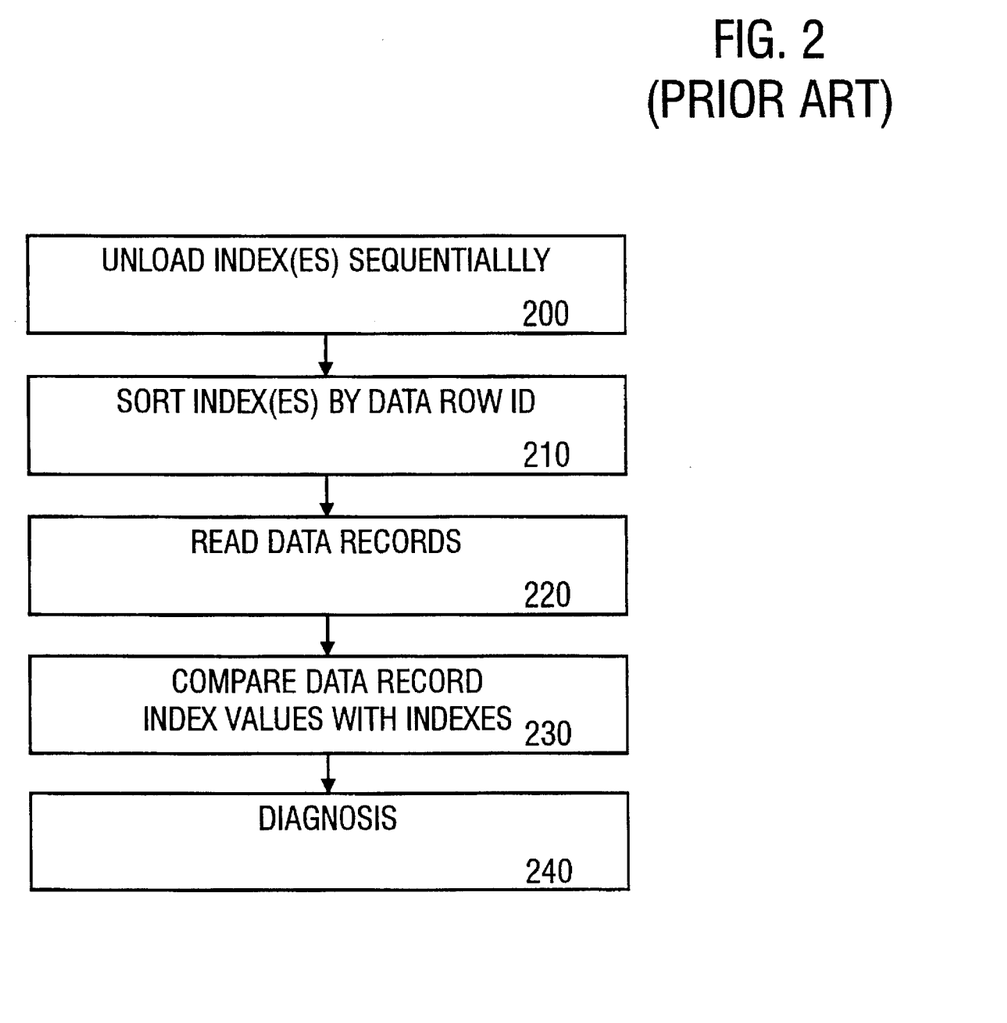
FIG. 2 a flow-chart overview, of a typical prior-art two-phase CHECK INDEX process in a DB2 database.

A conventional way of checking DB2 indexes is illustrated in FIGS. 1 and 2. One or more DB2 indexes 100 are UNLOADed in a first processing phase 105, which typically reads the index entries and sorts them into the order of the physical sequence of the rows indexed. A work or intermediate data set 110 is created from the output of the first processing phase 105. In a second processing phase 115, the contents of the work data set 110 are methodically compared with the actual physical data records read from DB2 table space(s) 120 to check the index integrity as described above, and appropriate diagnostic message(s) 125 are displayed. This process is shown in more detail in FIG. 2. The index(es) in question are UNLOADed sequentially at block 200. At block 210, the index(es) are sorted by the data row identifier (sometimes referred to as the row ID or RID). At block 220, the physical data records are read, and at block 230, the respective data records are compared with the corresponding index key values from the index-related work data set 110. At block 240, appropriate conventional diagnostic routines are executed to check the index integrity.

A significant disadvantage of the foregoing prior-art approach to the CHECK INDEX operation is that the various indexes are UNLOADed one after another, and subsequently the physical data records are read. The elapsed time required for the operation thus includes the sum of the elapsed times required for each of the index UNLOAD operations plus the time required for the reading of the associated physical data records. This is especially undesirable in installations which attempt to operate 24 hours a day, seven days a week; it may be highly undesirable to disable a data set, in effect, for the length of time required for a two-phase CHECK INDEX operation. Moreover, such an approach plainly requires additional input/output (I/O) steps, which can have tangible financial costs associated therewith. In some actual systems, storage space may be at a premium and thus the use of storage to create a working or intermediate data set may be undesirable.

SUMMARY OF THE INVENTION

A method in accordance with the invention entails performing a single-phase CHECK INDEX operation for a DB2 environment by creating a special SORT record for each data record and each index entry, collating the special SORT records in a particular way to group together the SORT records for each data record and any associated index entries, and performing diagnostic operations on the sorted records.

BRIEF DESCRIPTION OF THE DRAWINGS

FIG. 1 is a data flow diagram overview, and

DETAILED DESCRIPTION OF SPECIFIC EMBODIMENTS

One illustrative embodiment of the invention is described below as it might be implemented by loading of program of instructions (e.g., executable code or compilable or interpretable source code) on a general purpose computer system from a program storage device such as a magnetic tape, a floppy disk, an optical disk, etc., and causing the computer system to execute the program. In the interest of clarity, not all features of an actual implementation are described in this specification. It will of course be appreciated that in the development of any such actual implementation (as in any software development project), numerous implementation-specific decisions must be made to achieve the developers' specific goals and subgoals, such as compliance with system- and business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Figure 3:
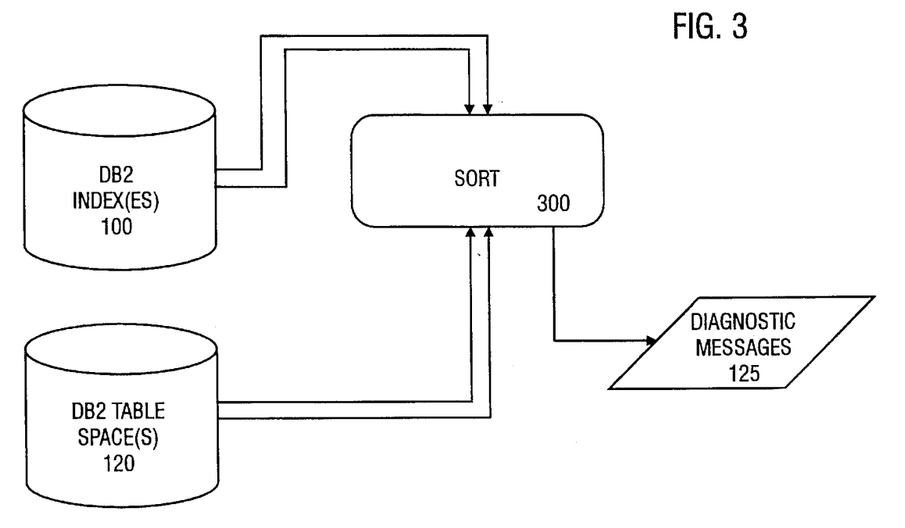
FIG. 3 is a data flow diagram of an improved single-phase CHECK INDEX process.
Figure 4:
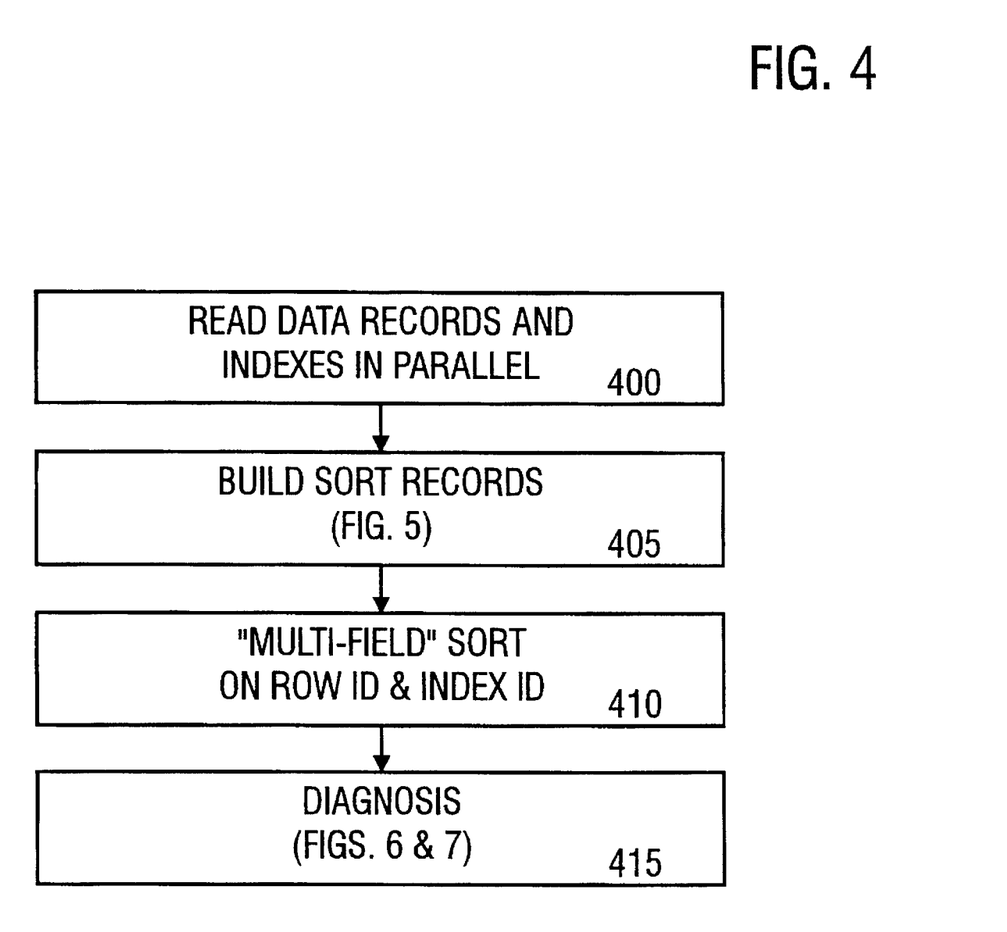
FIG. 4 is a flow-chart representation of the same process.

Referring to FIGS. 3 and 4, an improved CHECK INDEX operation takes advantage of an innovative use of the system SORT routine (e.g., the standard SORT routine supplied with the IBM MVS operating system or any desired third-party SORT routine). As shown in FIG. 3, the DB2 index(es) 100 and the physical data rows in the DB2 table space 120 are read in parallel and fed to a SORT routine 300. The output of the SORT routine is examined to diagnose potential problems with index integrity.

Referring now to FIG. 4, the method of the invention is shown in more detail. The physical data records to be checked are read from the DB2 table space(s) 120 along with the index records from the DB2 index(es) 100, as shown in block 400. Significantly, these READ operations are performed in parallel, thus reducing the elapsed time required to perform the CHECK INDEX operation.

Figure 5:
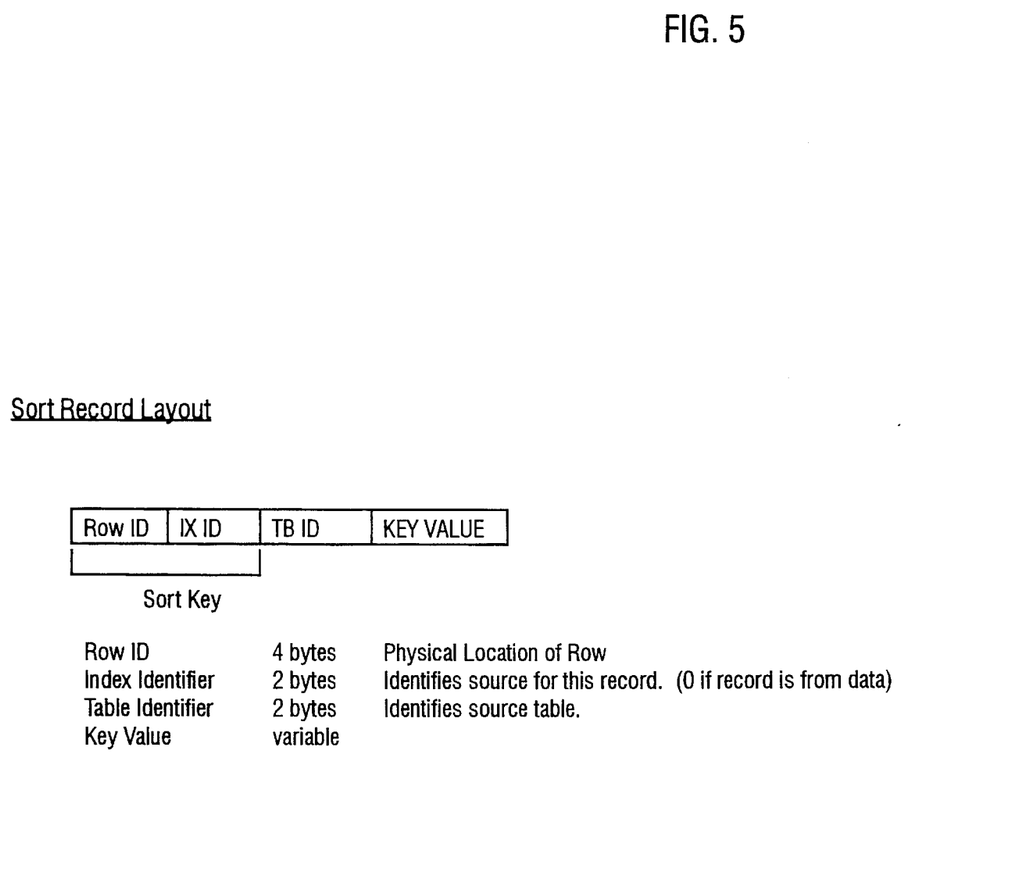
FIG. 5 shows a sort key used in the process.

At block 405, a series of SORT input records is constructed, one for each data row read from a DB2 table space and one for each index entry read from a DB2 index, as illustrated in more detail in FIG. 5. As is well-known to those of ordinary skill, each index entry includes a value identifying the data row that is indexed by the index entry (commonly referred to as the row ID or "RID"). Each SORT input record accordingly includes a row ID: if the SORT input record is for a data row, then the row ID is that of the data row; if the SORT input record is for an index entry, the row ID is that of the data row that is indexed. In the SORT record, the row ID immediately precedes an index identifier for the record in question. Similarly, the table ID (TB ID) identifies the DB2 table associated with the record in question (whether a table space record or an index record). Finally, the key value field of the SORT record is the index key value for the record in question. If the record in question is a physical data record from a DB2 table space, then the value of the index identifier is set at zero; otherwise, the value of the index identifier is a unique non-zero value uniquely identifying the particular DB2 index from which the index entry was read.

Returning to FIG. 4, the SORT records so constructed are fed to the system SORT routine where a two-part sort key is used. The sort key, as shown in FIG. 5, consists of the row ID immediately followed by the index ID. Consequently, the output of the SORT routine is a series of records in row ID order and for each row ID, in index ID order.

Figure 6:
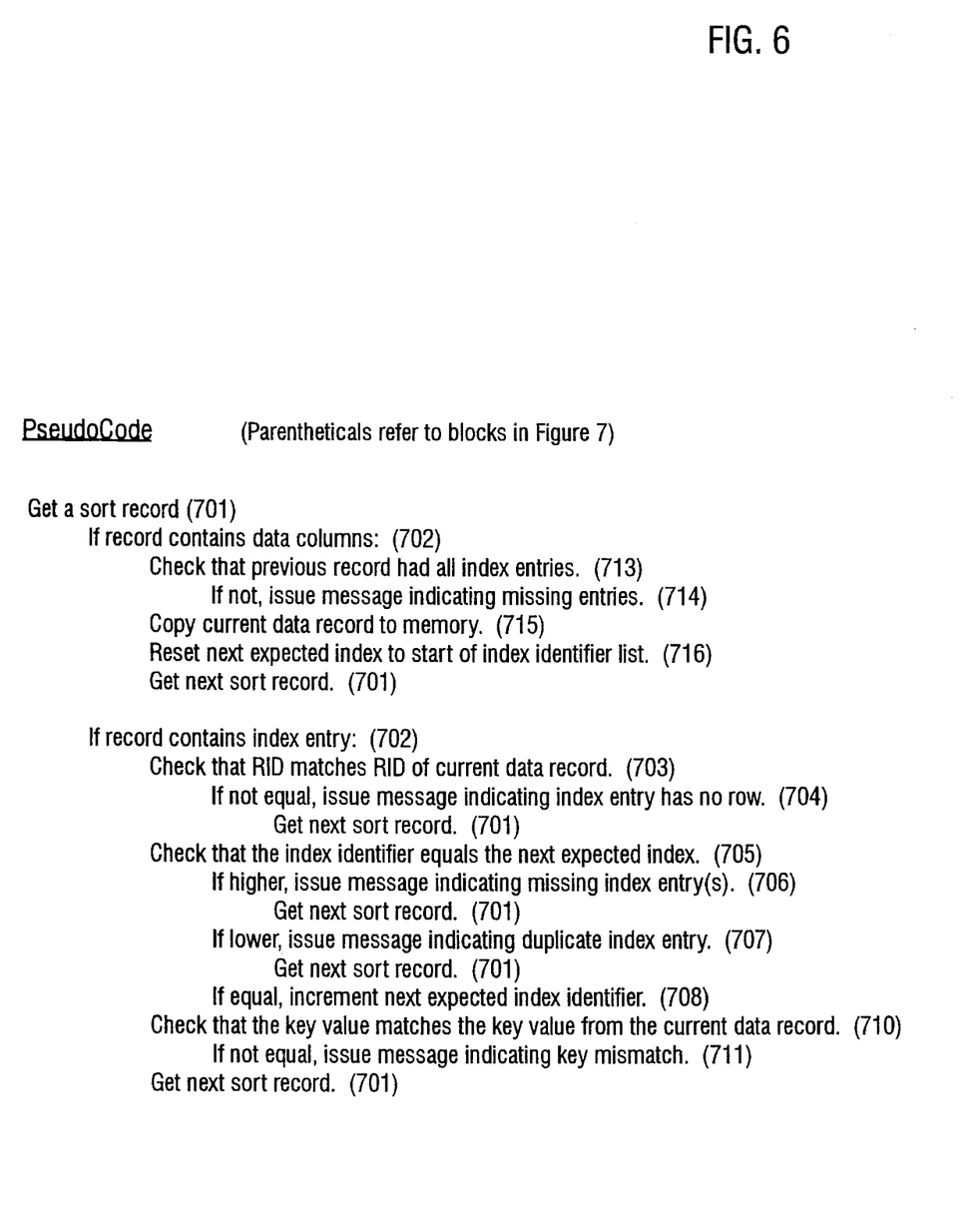
FIGS. 6 and 7 are pseudocode and flow-chart representations of an illustrative diagnostic routine.
Figure 7:
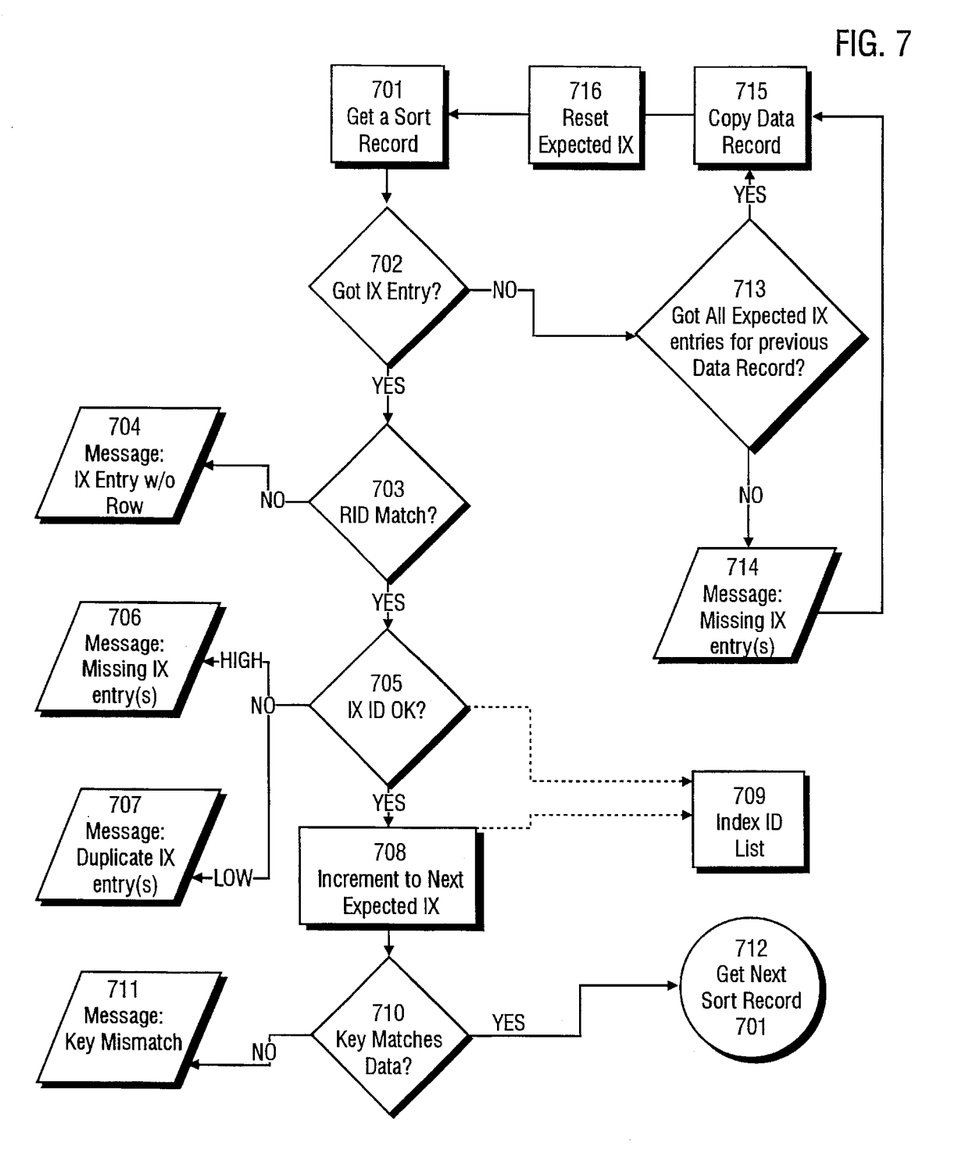

As shown in block 415 and FIGS. 6 and 7, the output of the SORT routine is tested, using any convenient diagnostic process, to determine whether any integrity problems exist in the data being tested. FIG. 6 shows a pseudocode representation of one diagnostic process, which is also shown in graphic flow chart form in FIG. 7.

A significant advantage of the method described herein is that the data-record and index-entry data are read in parallel, thus reducing elapsed time. Moreover, because a work data set 110 is not created, I/O resources are thereby conserved.

What is claimed is:

1. A method of testing DB2 index integrity, comprising the steps of:
   (a) reading, in parallel, (1) a plurality of DB2 data records from a DB2 table space, and (2) a plurality of DB2 index entries from each of at least one DB2 indexes associated with said DB2 table space, normally each said index entry being nominally associated with exactly one said DB2 data record;
   (b) constructing a SORT record for each said data record and each said index entry;
   (c) collating the SORT records for the data records and said SORT records for the index entries into a single sequence of SORT records to group together (1) the SORT records for each data record, with (2) the one or more SORT records for said one or more index entries associated with said respective date record; and
   (d) performing a specified diagnosis routine utilizing said single sequence of SORT records as an input.

2. A method of testing DB2 index integrity, comprising the steps of:
   (a) reading, in parallel, (1) a plurality of DB2 data records from a DB2 table space, and (2) a plurality of DB2 index entries from each of at least one DB2 indexes associated with said DB2 table space, each said index entry being nominally associated with exactly one said DB2 data record;
   (b) constructing a SORT record for each data record, each said SORT record respectively including (1) a row identifier field whose value uniquely identifies said respective data record, and (2) an index identifier field whose value indicates that said SORT record is associated with a data record;
   (c) constructing a SORT record for each said index entry, each said SORT record for said index entries respectively including (1) a field identifying the data record with which said index entry is associated, and (2) a field identifying the DB2 index from which the index entry was read;
   (d) collating the SORT records for the data records and said SORT records for the index entries into a single sequence of SORT records to group together (1) the SORT records for each data record, with (2) the one or more SORT records for said one or more index entries associated with said respective data record; and
   (e) performing a specified diagnosis routine utilizing said single sequence of SORT records as an input.

3. The method of a specified one of claims 1 and 2, wherein the SORT records are grouped so that the SORT record for a specified data record precedes any SORT record for an index entry associated with said specified data record.

4. A program storage device encoding a program of instructions, for a general-purpose programmable machine, wherein execution of said instructions by said machine results in performance of the method steps of claim 1.

5. A program storage device encoding a program of instructions, for a general-purpose programmable machine, wherein execution of said instructions by said machine results in performance of the method steps of claim 2.

6. A program storage device encoding a program of instructions, for a general-purpose programmable machine, wherein execution of said instructions by said machine results in performance of the method steps of claim 3.

* * * * *

UNITED STATES PATENT AND TRADEMARK OFFICE
CERTIFICATE OF CORRECTION

Patent No.: 5,579,515

Dated: December 16, 1993

Inventors: Thomas E. Hintz and Kerry C. Tenberg

It is certified that error appears in the above-identified patent and that said Letters Patent are hereby corrected as shown below:

```
Title page, Item [54], and col. 1, line 1,
      "METHOD OF CHECKING INDEX INTEGRITY IN A DB2 DATABASE"
should read
      --IMPROVED METHOD OF CHECKING INDEX INTEGRITY IN A DB2
      DATABASE--
```

In Column 4, line 4, the word "date" should read --data--.

Signed and Sealed this

Twenty-fifth Day of February, 1997

Attest:

BRUCE LEHMAN

*Attesting Officer*      *Commissioner of Patents and Trademarks*

UNITED STATES PATENT AND TRADEMARK OFFICE
CERTIFICATE OF CORRECTION

| | | |
|---|---|---|
| PATENT NO. | : | 5,579,515 |
| DATED | : | November 26, 1996 |
| INVENTOR(S) | : | Thomas E. Hintz and Kerry C. Tenberg |

It is certified that error appears in the above-identified patent and that said Letters Patent is hereby corrected as shown below:

In Column 4, line 4, the word "date" should read --data--.

This certificate supersedes Certificate of Correction issued February 25, 1997.

Signed and Sealed this

Twenty-seventh Day of January, 1998

Attest:

BRUCE LEHMAN

*Attesting Officer*      *Commissioner of Patents and Trademarks*